United States Patent
Kim (10) Patent No.: US 9,748,550 B2
(45) Date of Patent: Aug. 29, 2017

(54) ELECTRODE ASSEMBLY AND SECONDARY BATTERY HAVING THE SAME

(75) Inventor: Chanseok Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1117 days.

(21) Appl. No.: 13/560,752

(22) Filed: Jul. 27, 2012

(65) Prior Publication Data

US 2013/0149569 A1 Jun. 13, 2013

(30) Foreign Application Priority Data

Dec. 8, 2011 (KR) .................. 10-2011-0131349

(51) Int. Cl.
H01M 2/08 (2006.01)
H01M 2/30 (2006.01)
H01M 10/04 (2006.01)

(52) U.S. Cl.
CPC ..................................... *H01M 2/30* (2013.01)

(58) Field of Classification Search
None
See application file for complete search history.

(56) References Cited

U.S. PATENT DOCUMENTS

| | | | | |
|---|---|---|---|---|
| 2002/0010998 A1* | 1/2002 | Komatsu | ............... | H01M 2/021 29/623.2 |
| 2003/0044677 A1* | 3/2003 | Naruoka | ............. | H01M 2/0257 429/161 |
| 2010/0035144 A1* | 2/2010 | Oh | ........................ | H01M 2/021 429/164 |
| 2011/0129709 A1 | 6/2011 | Ahn et al. | | |
| 2011/0136000 A1* | 6/2011 | Moon | ................. | H01M 2/0285 429/163 |

FOREIGN PATENT DOCUMENTS

| | | |
|---|---|---|
| KR | 10-2006-0000101 A | 1/2006 |
| KR | 10-2008-0042961 A | 5/2008 |
| KR | 20080042961 A * | 5/2008 |
| KR | 10-1036067 B1 | 5/2011 |

OTHER PUBLICATIONS

Machine translation for Choi et al., KR 20080042961 A.*

* cited by examiner

*Primary Examiner* — Rena D Cronin
(74) *Attorney, Agent, or Firm* — Knobbe Martens Olson & Bear LLP (57) ABSTRACT

An electrode assembly and a secondary battery having the same are disclosed. In one embodiment, the electrode assembly includes a separator interposed between first and second electrode plates and a first electrode tab electrically connected to the first electrode plate; a second electrode tab electrically connected to the second electrode plate. The electrode assembly may further include an auxiliary tab electrically connected to at least one of the first and second electrode plates, wherein the auxiliary tab is positioned between the first and second electrode tabs.

20 Claims, 4 Drawing Sheets

ELECTRODE ASSEMBLY AND SECONDARY BATTERY HAVING THE SAME

RELATED APPLICATION

This application claims the benefit of Korean Patent Application No. 10-2011-0131349 filed on Dec. 8, 2011, the contents of which are incorporated herein by reference in their entirety.

BACKGROUND

Field

The described technology generally relates to an electrode assembly and a secondary battery having the same.

Description of the Related Technology

Secondary batteries are generally classified into cylindrical, prismatic and pouch-type batteries. The cylindrical and prismatic secondary batteries typically include an electrode assembly, a can accommodating the electrode assembly, and a cap assembly sealing a top opening of the can. In addition, the pouch-type secondary battery includes an electrode assembly and a case accommodating the electrode assembly.

SUMMARY

One inventive aspect is an electrode assembly having an auxiliary tab connected to a first electrode tab at a non-overlapping region of the first electrode tab and a second electrode tab on the outermost surface of the electrode assembly after it is wound.

Another aspect is a secondary battery, which can minimize a thickness deviation of an electrode assembly after it is wound by connecting a first electrode tab to an auxiliary tab and can suppress heat generation at an electrode tab region by allowing a fault current to flow to the auxiliary tab when abnormality, such as penetration of the electrode assembly, occurs.

Another aspect is an electrode assembly having a first electrode plate, a second electrode plate and a separator interposed between the first electrode plate and the second electrode plate, the electrode assembly including a first electrode tab electrically connected to the first electrode plate, a second electrode tab electrically connected to the second electrode plate, and an auxiliary tab electrically connected to at least one of the first electrode plate and the second electrode plate, wherein the auxiliary tab is positioned between the first electrode tab and the second electrode tab.

The auxiliary tab may be positioned on the outermost surface of the electrode assembly.

The outermost surface of the electrode assembly may be wrapped by at least one of the first electrode plate and the second electrode plate.

The first electrode plate may include on at least one surface of an electrode current collector an active material layer coated with a first electrode active material and a non-coated portion excluding the active material layer, the first electrode tab is connected to the non-coated portion formed at one end of the first electrode plate, and a portion of the auxiliary tab is connected to the end of the non-coated portion formed at the other end of the first electrode plate.

The other portion of the auxiliary tab may be connected to a region of the non-coated portion of the first electrode plate wrapping the outermost surface of the electrode assembly.

The first electrode tab and the second electrode tab may be spaced apart from the electrode assembly.

With respect to sectional thicknesses of the electrode assembly at a first spot having the first electrode tab, a second spot having the second electrode tab, and a third spot having the auxiliary electrode tab, a thickness deviation of each of the first spot, the second spot and the third spot may be in the range of 0.01 mm to 0.06 mm.

The first electrode tab may be connected to the auxiliary tab by welding.

Portions of the first electrode tab and the auxiliary tab drawn from the electrode assembly may be surrounded by an insulating member.

The insulating member may be formed of polyphenylene sulfide (PS), polyimide (PI) or polypropylene (PP).

Another aspect is a secondary battery including an electrode assembly having a first electrode plate, a second electrode plate and a separator interposed between the first electrode plate and the second electrode plate; and an electrode assembly accommodating unit sealed by accommodating the electrode assembly, wherein the electrode assembly includes a first electrode tab electrically connected to the first electrode plate; a second electrode tab electrically connected to the second electrode plate; and an auxiliary tab electrically connected to at least one of the first electrode plate and the second electrode plate, wherein the auxiliary tab is positioned between the first electrode tab and the second electrode tab.

The auxiliary tab may be formed at an overlapping region of at least one non-coated portion of the first electrode plate and the second electrode plate on the outermost surface of the electrode assembly.

In addition, the auxiliary tab may be electrically connected to at least one of the first electrode tab and the second electrode tab.

The electrode assembly accommodating unit may be a pouch.

In addition, the electrode assembly accommodating unit may accommodate the electrode assembly and may include a can having an opening with one open side and a cap plate sealing the opening of the can.

In the electrode assembly, an auxiliary tab connected to the first electrode tab is fixed to a non-overlapping region of the first electrode tab and the second electrode tab on the outermost surface of the electrode assembly by welding, thereby fixing the electrode assembly without a fixing tape.

In addition, since the electrode assembly has the auxiliary tab formed at the non-overlapping region of the first electrode tab and the second electrode tab, a thickness deviation of the electrode assembly after it is wound can be minimized.

In addition, the secondary battery includes an electrode assembly having a minimized thickness deviation of the electrode assembly wound by connecting the first electrode tab to an auxiliary tab, thereby suppressing swelling and ultimately improving safety of the secondary battery. In addition, when abnormality, such as penetration of a conductive material, occurs, the secondary battery can suppress heat generation at an electrode tab region by allowing a fault current to flow to the auxiliary tab.

Another aspect is an electrode assembly comprising: a separator interposed between first and second electrode plates; a first electrode tab electrically connected to the first electrode plate; a second electrode tab electrically connected to the second electrode plate; and an auxiliary tab electrically connected to at least one of the first and second electrode plates, wherein the auxiliary tab is positioned between the first and second electrode tabs.

In the above assembly, the auxiliary tab is positioned on an outermost surface of the electrode assembly. In the above assembly, the outermost surface of the electrode assembly is wrapped by at least one of the first and second electrode plates. In the above assembly, the first electrode plate includes a coated portion coated with an active material layer and a non-coated portion formed at first and second sides of the coated portion, wherein the first and second sides are opposing each other wherein the first electrode tab is connected to the non-coated portion adjacent to the first side, wherein at least a portion of the auxiliary tab is connected to the non-coated portion adjacent to the second side.

In the above assembly, another portion of the auxiliary tab is connected to the non-coated portion of the first electrode plate which forms an outermost surface of the electrode assembly. In the above assembly, the first and second electrode tabs are spaced apart from the electrode assembly. In the above assembly, with respect to sectional thicknesses of the electrode assembly at a first spot where the first electrode tab is formed, a second spot where the second electrode tab is formed, and a third spot where the auxiliary electrode tab is formed, a thickness deviation of each of the first, second and third spots is in the range of about 0.01 mm to about 0.06 mm.

In the above assembly, the first electrode tab is welded to the auxiliary tab. The above assembly further comprises an insulating member at least partially surrounding portions of i) the first electrode tab and ii) the auxiliary tab drawn from the electrode assembly. In the above assembly, the insulating member is formed of at least one of polyphenylene sulfide (PS), polyimide (PI) and polypropylene (PP).

Another aspect is a secondary battery comprising: an electrode assembly comprising a first electrode plate, a second electrode plate and a separator interposed between the first and second electrode plates; and an electrode assembly accommodating unit configured to accommodate the electrode assembly, wherein the electrode assembly comprises: a first electrode tab electrically connected to the first electrode plate; a second electrode tab electrically connected to the second electrode plate; and an auxiliary tab electrically connected to at least one of the first and second electrode plates, wherein the auxiliary tab is positioned between the first and second electrode tabs.

In the above battery, the auxiliary tab is formed at an overlapping region of i) a non-coated portion of the first electrode plate and ii) a non-coated portion of the second electrode plate located on an outermost surface of the electrode assembly. In the above battery, the auxiliary tab is electrically connected to at least one of the first and second electrode tabs. In the above battery, the electrode assembly accommodating unit is a pouch. In the above battery, the electrode assembly accommodating unit includes a can having an opening with one open side and a cap plate sealing the opening of the can.

Another aspect is an electrode assembly comprising: a first electrode plate having a first coated portion and a first non-coated portion; a second electrode plate having a second coated portion and a second non-coated portion; a first electrode tab formed on the first non-coated portion of the first electrode plate; a second electrode tab formed on the second non-coated portion of the second electrode plate; and a third electrode tab formed on at least one of the first and second non-coated portions, wherein the third electrode tab is formed between the first and second electrode tabs.

In the above assembly, the first non-coated portion is formed at first and second sides of the first coated portion, and wherein the first and second sides are opposing each other, wherein the second non-coated portion is formed at first and second sides of the second coated portion, and wherein the first and second sides are opposing each other, wherein the first electrode tab is formed on the first non-coated portion adjacent to the first side of the first coated portion, wherein the second electrode tab is formed on the second non-coated portion adjacent to the first side of the second coated portion, and wherein the third electrode tab is formed on at least one of the first and second non-coated portions which are adjacent to the second sides of the first and second coated portions.

In the above assembly, the third electrode tab is positioned on an outermost surface of the electrode assembly. In the above assembly, the outermost surface of the electrode assembly has two opposing ends, and wherein the third electrode tab extends from one end to the other end of the outermost surface of the electrode assembly. In the above assembly, the third electrode tab is arranged substantially parallel with the first and second electrode tabs.

DETAILED DESCRIPTION

In a rechargeable secondary battery, the electrode assembly is formed by stacking a positive electrode plate and a negative electrode plate with a separator interposed therebetween and winding the stacked structure. Here, the positive electrode plate includes a positive electrode current collector made of a highly conductive metal thin film, for example, an aluminum (Al) foil, and a positive electrode active material layer coated on both surfaces of the positive electrode current collector.

In addition, a region where the positive electrode active material layer is not formed, that is, the positive electrode non-coated portion, is formed at opposite ends of the positive electrode plate. The negative electrode plate includes a negative electrode current collector made of a highly conductive metal thin film, for example, a copper (Cu) or nickel (Ni) foil, and a negative electrode active material layer coated on both surfaces of the negative electrode current collector. In addition, a region where the negative electrode active material layer is not formed, that is, the negative electrode non-coated portion, is formed at opposite ends of the negative electrode plate. An electrode tab is coupled to each of the positive electrode non-coated portion of the positive electrode current collector and the negative electrode non-coated portion of the negative electrode current collector.

Embodiments will now be described in detail with reference to the accompanying drawings.

Figure 1:
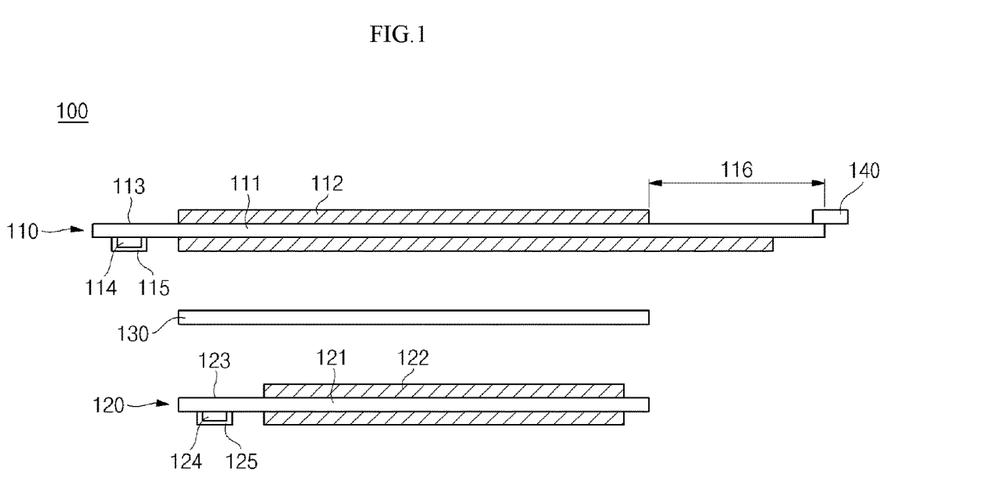
FIG. 1 is a cross-sectional view illustrating an electrode assembly including a positive electrode plate, a negative electrode plate and a separator according to an embodiment before it is wound.
Figure 2:
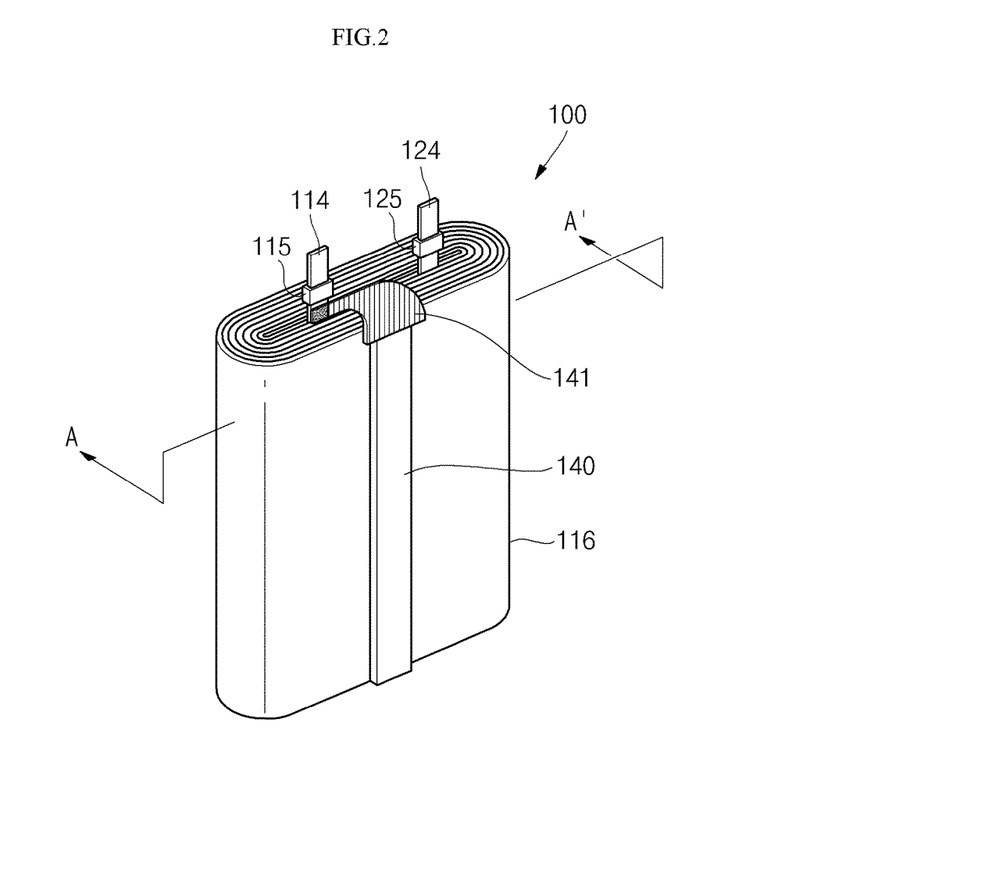
FIG. 2 is a perspective view illustrating the electrode assembly shown in FIG. 1 after it is wound.
Figure 3:
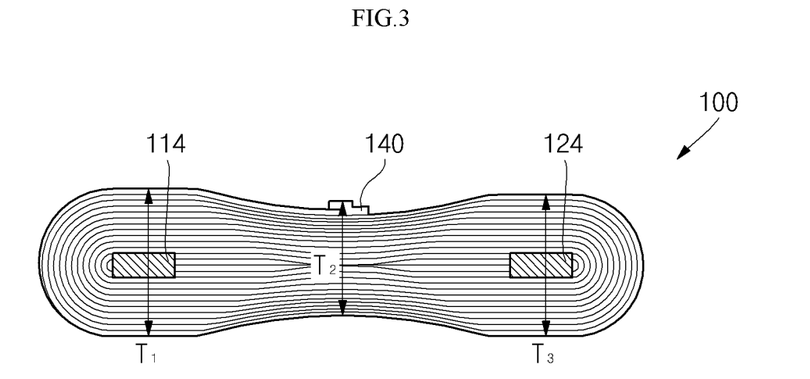
FIG. 3 is a vertical cross-sectional taken along the line A-A' of FIG. 2.

FIG. 1 is a cross-sectional view illustrating an electrode assembly 100 including a positive electrode plate, a negative electrode plate and a separator according to an embodiment before it is wound, FIG. 2 is a perspective view illustrating the electrode assembly shown in FIG. 1 after it is wound, and FIG. 3 is a vertical cross-sectional taken along the line A-A' of FIG. 2.

The electrode assembly 100 includes a first electrode plate 110, a second electrode plate 120 and a separator 130 interposed between the first and second electrode plates 110 and 120. The electrode assembly 100 may be formed by winding the electrode plates 110 and 120 and the separator 130 for example, in a jelly-roll configuration. A first electrode tab 114 electrically connected to the first electrode plate 110 and a second electrode tab 124 electrically connected to the second electrode plate 120 are drawn from one side of the electrode assembly 100. The first and second electrode tabs 114 and 124 are formed to be spaced apart from the electrode assembly 100. In addition, the electrode assembly 100 includes an auxiliary tab (or a third electrode tab) 140 electrically connected to at least one of the two electrode plates 110 and 120. In one embodiment, as shown in FIG. 2, the auxiliary tab 140 is formed on an outermost surface of the electrode assembly 100. The auxiliary tab 140 may be positioned between the first and second electrode tabs 114 and 124 (see FIG. 2 and FIG. 3). Insulating members 115 and 125 insulate the first electrode tab 114 and the second electrode tab 124 from the pouch to be described later.

In addition, one of the first and second electrode plates 110 and 120, for example, the first electrode plate 110, may be used as a positive electrode plate, and the other plate, for example, the second electrode plate 120, may be used as a negative electrode plate. However, the second electrode plate 120 may be used as a positive electrode plate and the first electrode plate 110 may be used as a negative electrode plate. For the purpose of convenience, the following description will be made with regard to an embodiment where the first electrode plate 110 is a positive electrode plate and the second electrode plate 120 is a negative electrode plate.

The first electrode plate 110 includes a first electrode current collector 111, a first electrode active material layer 112, and a first electrode non-coated portion 113.

The first electrode current collector 111 may be formed of an aluminum (Al) metal thin plate. In addition, the first electrode current collector 111 may be formed as a positive electrode plate by coating a positive electrode active material on at least one surface of the aluminum (Al) metal thin plate.

The first electrode active material layer 112 is formed by coating a positive electrode active material. The positive electrode active material may include a chalcogenide compound. Examples of the chalcogenide compound may include composite metal oxides such as $LiCoO_2$, $LiMn_2O_4$, $LiNiO_2$, $LiNi_{1-x}Co_xO_2$ ($0<x<1$), or $LiMnO_2$. In addition, the positive electrode active material may include an NCM-based positive electrode active material such as $Li[NiCoMn]O_2$, a NCA-based positive electrode active material such as $Li[NiAlCo]O_2$, or an LFP-based positive electrode active material such as $LiFePO_4$.

A positive electrode active material layer is not coated on the first electrode non-coated portion 113. The electrode non-coated portion 113 may be formed to opposite ends of the first electrode plate 110 in a winding direction of the first electrode plate 110. The first electrode tab 114 is connected to the non-coated portion 113 formed at one end of the first electrode plate 110, and a portion of the auxiliary tab 140 is connected to the non-coated portion 116 formed at the other end of the first electrode plate 110. In addition, the first electrode tab 114 and the auxiliary tab 140 may be coupled to the respective non-coated portions 113 and 116 to be drawn out from the electrode assembly 100. One example of the coupling method may include welding, and the welding may include resistance welding, laser welding, or the like. The first electrode tab 114 may be formed of a conductive material, such as copper, nickel, or aluminum, combinations thereof, or other metallic materials.

The first electrode plate 110 may be formed to wrap the outermost surface of the electrode assembly 100. In this case, the outermost surface of the electrode assembly 100 may be surrounded by the non-coated portion 116 of the first electrode plate 110. In one embodiment, the auxiliary tab 140 is positioned on the outermost surface of the electrode assembly 100 which is wrapped by the non-coated portion 116 of the first electrode plate 110. Therefore, in this embodiment, since the auxiliary tab 140 is formed at the end of the wound electrode assembly 100, the electrode assembly 100 can be fixed without a fixing tape.

The second electrode plate 120 includes a second electrode current collector 121, a second electrode active material layer 122 and a second electrode non-coated portion 123.

The second electrode current collector 121 may be formed of a copper (Cu) metal thin plate. The copper (Cu) metal thin plate may be formed as a negative electrode plate by coating a negative electrode active material on at least one surface of the copper (Cu) metal thin plate. However, the present disclosure is not limited to the current collector materials described above.

The second electrode active material layer 122 is formed by coating the negative electrode active material. Examples of the negative electrode active material may include a lithium metal, a metallic material capable of alloying with lithium, a transition metal oxide, a material capable of doping or undoping lithium, a material capable of forming a compound by irreversibly reacting with lithium, or a material capable of reversibly intercalating/deintercalating lithium ion. Examples of the metallic material capable of alloying with lithium may be selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi and combinations thereof. Examples of the transition metal oxide, the material capable of doping or undoping lithium, and the material capable of forming a compound by irreversibly reacting with lithium may include a vanadium oxide, a lithium vanadium oxide, Si, $SiO_x$ ($0<x<2$), a Si containing metal alloy, Sn, $SnO_2$, and composite tin alloys. However, the present disclosure is not limited to the electrode active materials described above.

The second electrode tab 124 may be formed of a conductive material, such as copper, nickel, or aluminum, alloys thereof, or other metallic materials.

The separator 130 separates the first and second electrode plates 110 and 120 from each other. The separator 130 may have fine pores, and lithium ions pass through the fine pores. The separator 130 may be formed of a polymer resin such as polyethylene (PE) or polypropylene (PP). However, the present disclosure is not limited to the above separator materials. In order to prevent a short circuit between the first and second electrode plates 110 and 120, the separator 130 may be formed to have an area corresponding to that of the second electrode plate 120.

The auxiliary tab 140 is electrically connected to at least one of the electrode plates 110 and 120. For the purpose of convenience, the following description will be made with regard to an embodiment where the auxiliary tab 140 is electrically connected to the first electrode plate 110. However, the auxiliary tab 140 may be electrically connected to the second electrode plate 120, or both of the first and second electrode tabs 114 and 124.

In one embodiment, one portion of the auxiliary tab 140 is connected to an end of the non-coated portion of the first electrode plate 110 and the other portion of the auxiliary tab 140 is connected to one side of the electrode assembly 100. The auxiliary tab 140 may be connected to the first electrode tab 114 at a portion protruding from one side of the electrode assembly 100. The auxiliary tab 140 may be formed of the same material as the first electrode tab 114. In this case, contact resistance between the first electrode tab 114 and the auxiliary tab 140 can be reduced when the two elements 114 and 140 are coupled to each other. One example of the coupling method may include welding, and the welding may include resistance welding, laser welding, or the like. Resistance welding may be generally used. The first electrode tab 114 and the auxiliary tab 140 drawn from the electrode assembly 110 are surrounded by an insulating member 141.

In one embodiment, as shown in FIGS. 2 and 3, the auxiliary tab 140 is formed between the first and second electrode tabs 114 and 124. One portion of the auxiliary tab 140 is connected to an end of the non-coated portion of the first electrode plate 110 and the other portion of the auxiliary tab 140 is connected to a region of the non-coated portion 116 of the first electrode plate 110 wrapping the outermost surface of the electrode assembly 100. When a conductive material penetrates into the electrode assembly 100, the auxiliary tab 140 may bypass an internal current of the electrode assembly 100 to the environment or outside the electrode assembly 100.

In addition, the auxiliary tab 140 is positioned on the outermost surface of the electrode assembly 100 between the electrode tabs 114 and 124. In this case, a thickness deviation of the winding section of the electrode assembly 100 is minimized.

Referring to FIG. 3, in sectional thicknesses of the electrode assembly 100 at a first spot (T1) where the first electrode tab 114 is formed, a second spot (T2) where the second electrode tab 124 is formed, and a third spot (T3) where the auxiliary electrode tab 140 is formed, a thickness deviation of each of the first, second and third spots T1-T3 is in the range of about 0.01 mm to about 0.06 mm.

Table 1 below lists measurement results of thickness changes of an electrode assembly having a 4.02 mm section at the three spots T1-T3 in Comparative Examples 1 to 5 in which the auxiliary tab 140 is not attached to comparison targets. Table 2 below lists measurement results of thickness changes of an electrode assembly having a 4.02 mm section at the three spots T1-T3 in Experimental Examples 1 to 5 in which the auxiliary tab 140 is attached to experiment targets.

TABLE 1

| Thickness change | Comparison target (mm) | | | |
| --- | --- | --- | --- | --- |
| | T1 | T2 | T3 | Deviation |
| Comparison 1 | 4.15 | 4.29 | 4.09 | 0.10 |
| Comparison 2 | 4.08 | 4.36 | 4.07 | 0.16 |
| Comparison 3 | 4.17 | 4.31 | 4.03 | 0.14 |
| Comparison 4 | 4.12 | 4.42 | 4.03 | 0.20 |
| Comparison 5 | 4.19 | 4.35 | 3.99 | 0.18 |

According to Comparative Examples 1 to 5 shown in Table 1, the thickness of the third spot T3 where the first and second electrode tabs 114 and 124 are not located is smaller than that of the first spot T1 or the second spot T2. In addition, the thickness deviation of each of the first to third spots T1-T3 is in a range of about 0.10 mm to about 0.20 mm. If the thickness of the third spot T3 is smaller than that of the first spot T1 or the second spot T2, a swelling phenomenon that the third spot T3 having a relatively small thickness is excessively swelled may occur to the electrode assembly 100 by repeated cycles of charging and discharging operations.

TABLE 2

| Thickness change | Experiment target (mm) | | | |
| --- | --- | --- | --- | --- |
| | T1 | T2 | T3 | Deviation |
| Experiment 1 | 3.99 | 3.91 | 3.95 | 0.04 |
| Experiment 2 | 3.95 | 3.9 | 3.97 | 0.04 |
| Experiment 3 | 3.88 | 3.84 | 3.96 | 0.06 |
| Experiment 4 | 3.93 | 3.89 | 3.94 | 0.03 |
| Experiment 5 | 3.92 | 3.98 | 4.05 | 0.06 |

According to Experimental Examples 1 to 5 shown in Table 2, with respect to sectional thicknesses of the electrode assembly at the spots T1-T3, a thickness deviation of each of the three spots T1-T3 is in the range of about 0.01 mm to about 0.06 mm. When the thickness deviations listed in Tables 1 and 2 are compared, the electrode assembly 100 having the auxiliary tab 140 formed between the first electrode tab 114 and the second electrode tab 124 has a substantially uniform sectional thickness. As described above, if the electrode assembly 100 has a substantially uniform sectional thickness, it is possible to suppress the electrode assembly 100 from swelling, thereby improving safety of the secondary battery.

Next, a secondary battery 200 according to an embodiment will be described.

Figure 4:
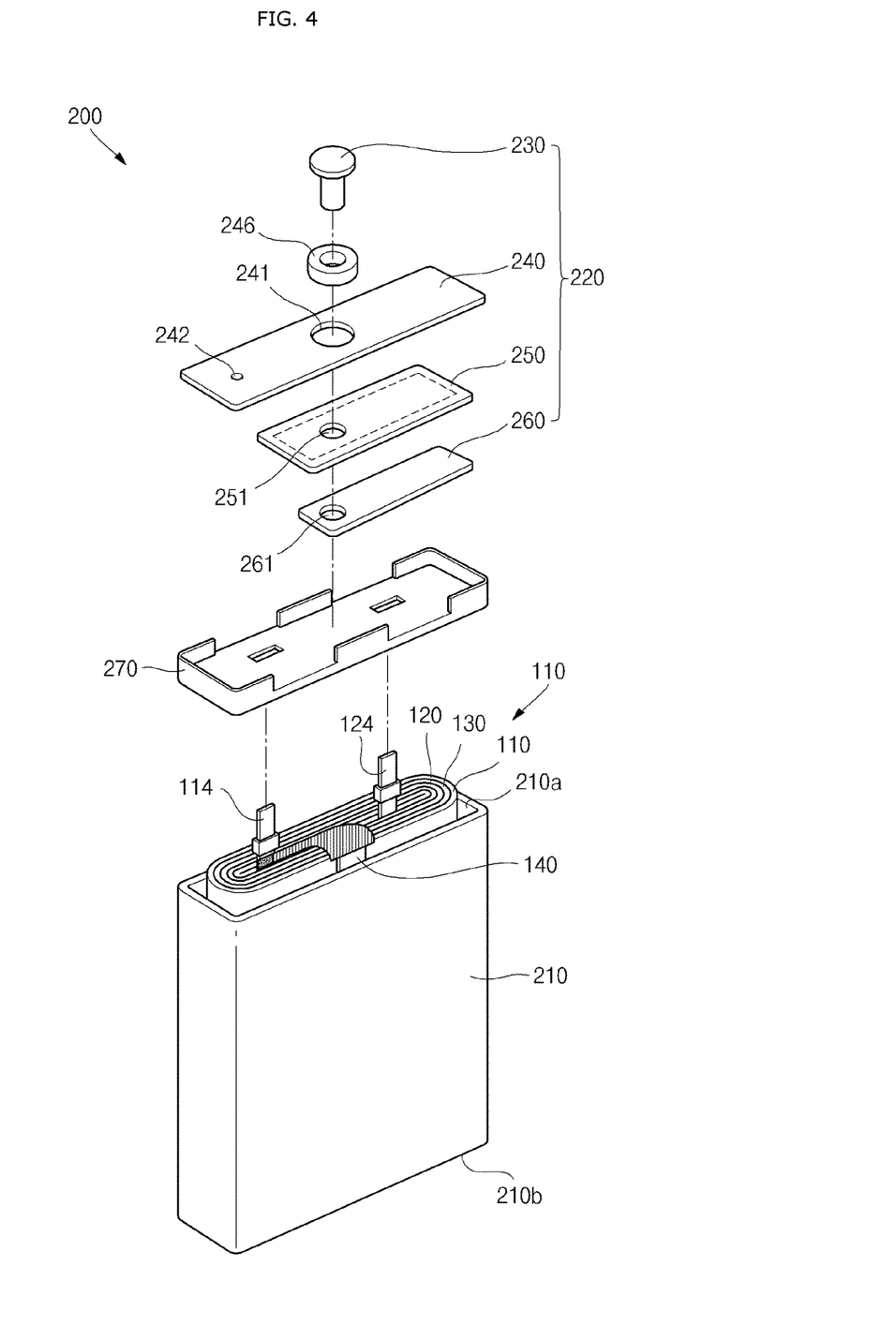
FIG. 4 is an exploded perspective view illustrating a secondary battery including the electrode assembly shown in FIG. 2.

FIG. 4 is an exploded perspective view illustrating a secondary battery 200 including the electrode assembly shown in FIG. 2.

While FIG. 4 illustrates a prismatic secondary battery the present disclosure may be applied to other types of a secondary battery such as a cylindrical secondary battery.

The secondary battery 200 includes an electrode assembly 100, a can 210, a cap assembly 220 and an electrode terminal 230.

Since the electrode assembly 100 is substantially the same as that shown in FIGS. 1 to 3, the following description will be mainly made with regard to features of the electrode assembly 100 different from the previous embodiments. The electrode assembly 100 has a first electrode plate 110 and a second electrode plate 120 having different polarities and a separator 130. The first electrode plate 110 may have a positive electrode active material coated thereon and the second electrode plate 120 may have a negative electrode active material coated thereon. The first electrode plate 110 has a non-coated portion connected to a first electrode tab 114, and the second electrode plate 120 has a non-coated portion connected to a second electrode tab 124. In addition, the first electrode tab 114 is electrically connected to the electrode terminal 230. In addition, the first electrode tab 114 is electrically connected to an auxiliary tab 140 of the electrode assembly 100. The auxiliary tab 140 may be formed between the first and second electrode tabs 114 and 124. In addition, the auxiliary tab 140 may be formed on an outermost surface of the electrode assembly 100. When a conductive material penetrates into the electrode assembly 100, the auxiliary tab 140 may bypass an internal current of the electrode assembly 100 to the environment or outside the electrode assembly 100. Further, the auxiliary tab 140 may suppress a swelling phenomenon by forming the electrode assembly 100 having a uniform thickness.

The can 210 is generally formed of a metallic material such as aluminum (Al) or an alloy thereof using a deep drawing method. A bottom surface 210b of the can 210 is substantially planar. The can 210 itself may serve as a terminal. A top surface of the can 210 is opened, forming a top opening 210a, and the electrode assembly 100 is accommodated in the can 210 through the top opening 210a.

The cap assembly 220 includes an electrode terminal 230, a cap plate 240, an insulation plate 250 and a terminal plate 260.

A separate insulation case 270 is coupled to the cap plate 240 and then coupled to the top opening 210a of the can 210 to seal the can 210. A throughhole 241 is formed in the cap plate 240 to allow the electrode terminal 230 to be inserted thereto. A gasket 246 is formed between the throughhole 241 and the electrode terminal 230, thereby achieving sealing of the can 210. The cap plate 240 includes an electrolyte injection hole (not shown) a plug 242 and a safety vent (not shown).

In addition, the cap plate 240 includes an insulation plate 250 and a terminal plate 260 provided at its lower portion. The insulation plate 250 has a first terminal hole 251 located to correspond to the throughhole 241 of the cap plate 240. The insulation plate 250 is formed of an insulating material, such as a gasket 246.

The terminal plate 260 is mounted on a bottom surface of the insulation plate 250. The terminal plate 260 may be generally formed of a nickel alloy. The terminal plate 260 has a second terminal hole 261 located to correspond to the terminal hole1 251. The electrode terminal 230 penetrates the throughhole 241, the first terminal hole1 251 and the second terminal hole 261 and is coupled thereto. The terminal plate 260 has one side connected to at least one of the first electrode tab 114 and the second electrode tab 124. In addition, either the first electrode tab 114 or the second electrode tab 124 is coupled to a bottom surface of the cap plate 240. One example of the coupling method may include welding, and the welding may include resistance welding, laser welding, or the like. Resistance welding may be generally used.

Next, a pouch-type secondary battery 300 according to another embodiment will be described.

Figure 5:
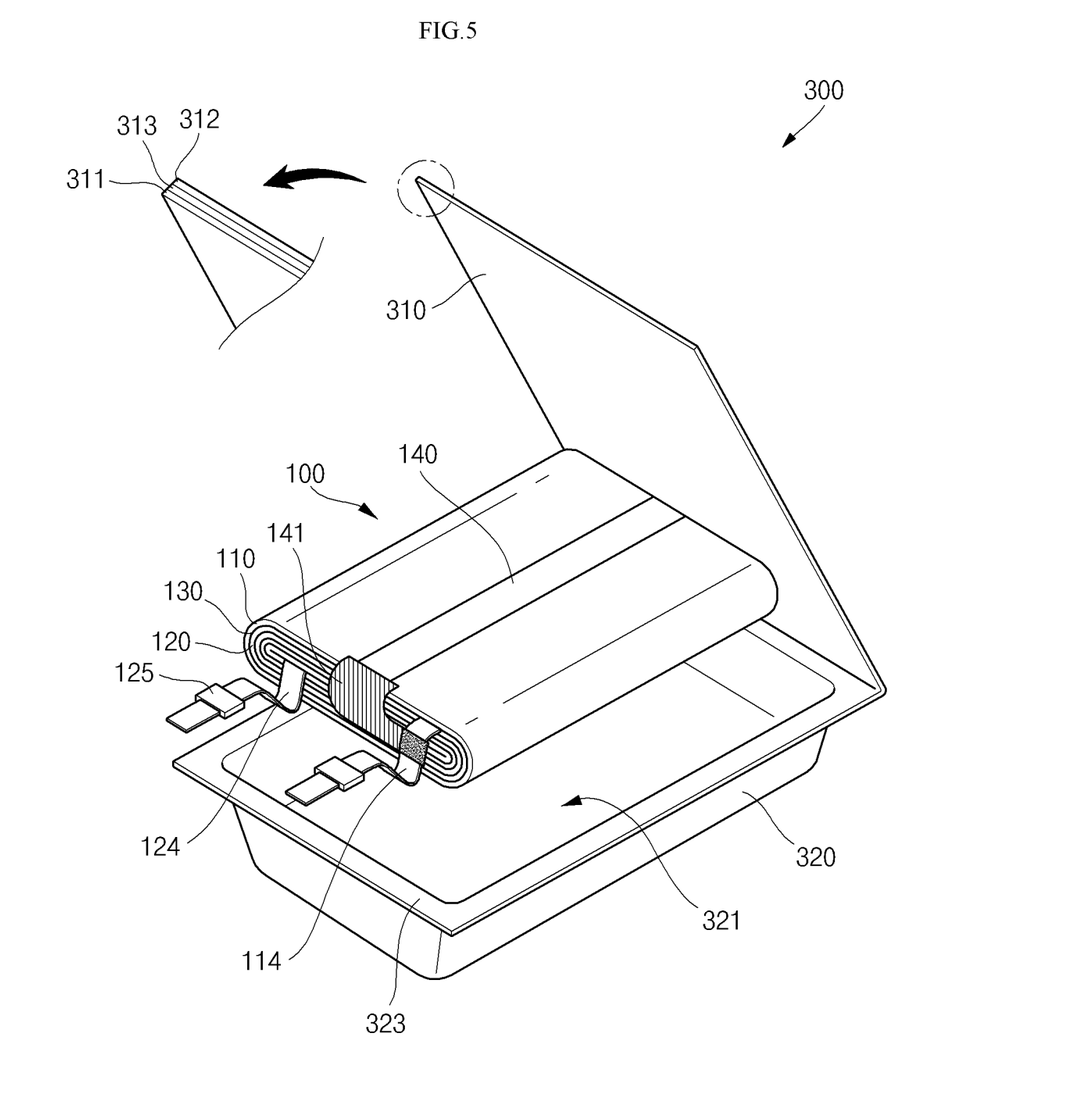
FIG. 5 is an exploded perspective view illustrating a secondary battery according to another embodiment.

FIG. 5 is an exploded perspective view illustrating a secondary battery 300 according to another embodiment.

The pouch-type secondary battery 300 includes an electrode assembly 100 and a pouch accommodating and sealing the electrode assembly 100.

Since the electrode assembly 100 is substantially the same as that shown in FIGS. 1 to 3, the following description will be mainly made with regard to features of the electrode assembly 100 different from the previous embodiments. The electrode assembly 100 has a first electrode plate 110 and a second electrode plate 120 having different polarities and a separator 130. The first electrode plate 110 may have a positive electrode active material coated thereon and the second electrode plate 120 may have a negative electrode active material coated thereon. The first electrode plate 110 has a non-coated portion connected to a first electrode tab 114, and the second electrode plate 120 has a non-coated portion connected to a second electrode tab 124. In addition, the first electrode tab 114 is electrically connected to an auxiliary tab 140 of the electrode assembly 100. The auxiliary tab 140 is formed between the first and second electrode tabs 114 and 124. In addition, the auxiliary tab 140 may be formed on the outermost surface of the electrode assembly 100. When a conductive material penetrates into the electrode assembly 100, the auxiliary tab 140 may bypass an internal current of the electrode assembly 100 to the environment or outside the electrode assembly 100. Further, the auxiliary tab 140 may suppress a swelling phenomenon by forming the electrode assembly 100 having a substantially uniform thickness. The auxiliary tab 140 may be coupled to the first electrode tab 114 within the pouch, which will be described below.

The pouch includes a casted polypropylene (CPP) layer 311, a metal thin film 313 and an insulation layer 312. With respect to the inside of the pouch, in which the electrode assembly 100 is accommodated, the CPP layer 311, the metal thin film 313 and the insulation layer 312 may be sequentially stacked in the pouch. The CPP layer 311 may be formed of a composite material of an organic material and an inorganic material. The metal thin film 313 may be formed of aluminum. The insulation layer 312 may be formed of nylon. The pouch is bent at its middle portion, defining an upper portion 310 and a lower portion 320. The inside of the pouch can be hermetically sealed by bonding the upper and lower portions 310 and 320.

The lower portion 320 of the pouch may include an electrode assembly accommodating unit 321 and a sealing unit 323. The electrode assembly accommodating unit 321 may be formed by pressing the lower portion 320 of the pouch to accommodate the electrode assembly 100. The sealing unit 323 may extend from an upper side of the electrode assembly accommodating unit 321. The upper portion 310 of the pouch may be formed into an upper sealing unit (not shown) located to correspond to the sealing unit 323. The upper sealing unit may be adhered to the sealing unit 323 by, for example, heating and pressing, thereby hermetically sealing the inside of the pouch.

Although the above embodiments have been described with reference to the accompanying drawings, it will be understood by those skilled in the art that a variety of modifications and variations may be made without departing from the spirit or scope of the appended claims.

What is claimed is:

1. An electrode assembly comprising:
a separator interposed between first and second electrode plates;
a first electrode tab electrically connected to the first electrode plate;
a first insulating member surrounding a first portion of the first electrode tab;
a second electrode tab electrically connected to the second electrode plate;
a second insulating member surrounding a first portion of the second electrode tab;
an auxiliary tab electrically connected to at least one of the first and second electrode plates, wherein the auxiliary tab is formed between the first and second electrode tabs so as to not overlap the first and second electrode tabs in a thickness direction of the electrode assembly; and
a third insulating member connecting the auxiliary tab and a second portion of only one of the first and second electrode tabs different from the first portion.

2. The electrode assembly of claim 1, wherein the auxiliary tab is positioned on an outermost surface of the electrode assembly.

3. The electrode assembly of claim 2, wherein the outermost surface of the electrode assembly is wrapped by at least one of the first and second electrode plates.

4. The electrode assembly of claim 1, wherein the first electrode plate includes a coated portion coated with an active material layer and a non-coated portion formed at first and second sides of the coated portion, wherein the first and second sides are opposing each other wherein the first electrode tab is connected to the non-coated portion adjacent to the first side, wherein at least a portion of the auxiliary tab is connected to the non-coated portion adjacent to the second side.

5. The electrode assembly of claim 4, wherein another portion of the auxiliary tab is connected to the non-coated portion of the first electrode plate which forms an outermost surface of the electrode assembly.

6. The electrode assembly of claim 1, wherein the first and second electrode tabs are spaced apart from the electrode assembly.

7. The electrode assembly of claim 1, wherein with respect to sectional thicknesses of the electrode assembly at a first spot where the first electrode tab is formed, a second spot where the second electrode tab is formed, and a third spot where the auxiliary electrode tab is formed, a thickness deviation of each of the first, second and third spots is in the range of about 0.01 mm to about 0.06 mm.

8. The electrode assembly of claim 1, wherein the first electrode tab is welded to the auxiliary tab.

9. The electrode assembly of claim 8, wherein the third insulating member at least partially surrounds portions of i) the first electrode tab and ii) the auxiliary tab drawn from the electrode assembly.

10. The electrode assembly of claim 9, wherein the third insulating member is formed of at least one of polyphenylene sulfide (PS), polyimide (PI) and polypropylene (PP).

11. A secondary battery comprising:
an electrode assembly comprising a first electrode plate, a second electrode plate and a separator interposed between the first and second electrode plates; and
an electrode assembly accommodating unit configured to accommodate the electrode assembly,
wherein the electrode assembly comprises:
a first electrode tab electrically connected to the first electrode plate;
a first insulating member surrounding a first portion of the first electrode tab;
a second electrode tab electrically connected to the second electrode plate;
a second insulating member surrounding a first portion of the second electrode tab;
an auxiliary tab electrically connected to at least one of the first and second electrode plates, wherein the auxiliary tab is formed between the first and second electrode tabs so as to not overlap the first and second electrode tabs in a thickness direction of the electrode assembly; and
a third insulating member connecting the auxiliary tab and a second portion of only one of the first and second electrode tabs different from the first portion.

12. The secondary battery of claim 11, wherein the auxiliary tab is formed on a non-coated portion of the first electrode plate.

13. The secondary battery of claim 11, wherein the auxiliary tab is electrically connected to at least one of the first and second electrode tabs.

14. The secondary battery of claim 11, wherein the electrode assembly accommodating unit is a pouch.

15. The secondary battery of claim 14, wherein the electrode assembly accommodating unit includes a can having an opening with one open side and a cap plate sealing the opening of the can.

16. An electrode assembly comprising:
a first electrode plate having a first coated portion and a first non-coated portion;
a second electrode plate having a second coated portion and a second non-coated portion;
a first electrode tab formed on the first non-coated portion of the first electrode plate;
a first insulating member surrounding a first portion of the first electrode tab;
a second electrode tab formed on the second non-coated portion of the second electrode plate;
a second insulating member surrounding a first portion of the second electrode tab;
a third electrode tab formed on at least one of the first and second non-coated portions, wherein the third electrode tab is formed between the first and second electrode tabs so as to not overlap the first and second electrode tabs in a thickness direction of the electrode assembly; and
a third insulating member connecting the third electrode tab and a second portion of only one of the first and second electrode tabs different from the first portion.

17. The electrode assembly of claim 16, wherein the first non-coated portion is formed at first and second sides of the first coated portion, and wherein the first and second sides are opposing each other,
wherein the second non-coated portion is formed at first and second sides of the second coated portion, and wherein the first and second sides are opposing each other,
wherein the first electrode tab is formed on the first non-coated portion adjacent to the first side of the first coated portion,
wherein the second electrode tab is formed on the second non-coated portion adjacent to the first side of the second coated portion,
and wherein the third electrode tab is formed on at least one of the first and second non-coated portions which are adjacent to the second sides of the first and second coated portions.

18. The electrode assembly of claim 16, wherein the third electrode tab is positioned on an outermost surface of the electrode assembly.

19. The electrode assembly of claim 18, wherein the outermost surface of the electrode assembly has two opposing ends, and wherein the third electrode tab extends from one end to the other end of the outermost surface of the electrode assembly.

20. The electrode assembly of claim 16, wherein the third electrode tab is arranged substantially parallel with the first and second electrode tabs.

* * * * *